(12) United States Patent
Villien

(10) Patent No.: US 11,947,021 B2
(45) Date of Patent: Apr. 2, 2024

(54) METHOD FOR DETERMINING THE POSITION AND ORIENTATION OF A VEHICLE

(71) Applicant: Commissariat à l'Energie Atomique et aux Energies Alternatives, Paris (FR)

(72) Inventor: Christophe Villien, Grenoble (FR)

(73) Assignee: Commissariat à l'Energie Atomique et aux Energies Alternatives, Paris (FR)

( * ) Notice: Subject to any disclaimer, the term of this patent is extended or adjusted under 35 U.S.C. 154(b) by 568 days.

(21) Appl. No.: 17/172,278

(22) Filed: Feb. 10, 2021

(65) Prior Publication Data

US 2021/0263162 A1    Aug. 26, 2021

(30) Foreign Application Priority Data

Feb. 21, 2020  (FR) .................................... 20 01719

(51) Int. Cl.
*G01S 19/31*  (2010.01)
*G01S 19/35*  (2010.01)

(52) U.S. Cl.
CPC .............. *G01S 19/31* (2013.01); *G01S 19/35* (2013.01)

(58) Field of Classification Search
CPC .......... G01S 19/31; G01S 19/35; G01S 19/49; G01C 21/165
See application file for complete search history.

(56) References Cited

U.S. PATENT DOCUMENTS

| 10,295,366 B2* | 5/2019 | Suzuki | G01C 23/00 |
| 2008/0294342 A1* | 11/2008 | Hoshizaki | G01S 19/47 |
| | | | 701/472 |
| 2009/0018772 A1* | 1/2009 | Watanabe | G01C 21/165 |
| | | | 701/472 |
| 2009/0326740 A1 | 12/2009 | Wang et al. | |
| 2010/0030471 A1* | 2/2010 | Watanabe | G01C 21/26 |
| | | | 701/494 |
| 2016/0029943 A1* | 2/2016 | Mizuochi | A61B 5/0022 |
| | | | 600/595 |
| 2016/0047675 A1* | 2/2016 | Tanenhaus | G01C 25/005 |
| | | | 702/104 |

(Continued)

OTHER PUBLICATIONS

Wang et al. (Attitude Determination Method by Fusing Single Antenna GPS and Low Cost MEMS Sensors Using Intelligent Kalman Filter Algorithm, 2017, IEEE) (Year: 2017).*

(Continued)

*Primary Examiner* — Mohammad K Islam
(74) *Attorney, Agent, or Firm* — Oblon, McClelland, Maier & Neustadt, L.L.P.

(57) ABSTRACT

Constructing an estimated orientation of the vehicle from a previous position and a previous orientation of the vehicle, then correcting this estimated orientation to obtain a first corrected orientation containing a corrected yaw angle of the vehicle, obtaining a measurement of the yaw angle of the vehicle, then replacing, in the first corrected orientation, the corrected yaw angle with the measured yaw angle, to obtain a second corrected orientation, then delivering the corrected second orientation by way of orientation determined for the vehicle and using, in the next execution of the constructing step, the corrected second orientation by way of previous orientation.

12 Claims, 2 Drawing Sheets

(56) References Cited

U.S. PATENT DOCUMENTS

| | | | |
|---|---|---|---|
| 2016/0223344 A1* | 8/2016 | Sanami | B60L 3/12 |
| 2017/0232974 A1* | 8/2017 | Nishida | B60W 60/0059 701/24 |
| 2018/0017390 A1 | 1/2018 | Shen et al. | |
| 2018/0202833 A1* | 7/2018 | Suzuki | G01C 21/12 |
| 2018/0245924 A1* | 8/2018 | Ishigami | G01C 21/165 |
| 2020/0348137 A1* | 11/2020 | Jain | G01C 21/165 |
| 2021/0362597 A1* | 11/2021 | Cho | B60K 37/06 |

OTHER PUBLICATIONS

French Preliminary Search Report dated Nov. 18, 2020 in French Application 20 01719 filed February 21, 2020 (with English Translation of Categories of Cited Documents and Written Opinion), 12 pages.

Syed, Z. et al. "Economical and Robust Inertial Sensor Configuration for a Portable Navigation System," Proceedings of the 20$^{th}$ International Technical Meeting of the Satellite Division of the Institute of Navigation (ION GNSS 2007), Sep. 25-28, 2007, XP056010349, 7 pages.

Godha, S., "Performance Evaluation of Low Cost MEMS-Based IMU Integrated With GPS for Land Vehicle Navigation Application," Geomatics Engineering, UCGE Reports, No. 20239, February 2006, 230 pages.

Xu, X. et al., "In-Motion Coarse Alignment Method for SINS/GPS Using Position Loci," IEEE Sensors Journal, vol. 19, No. 10, May 15, 2019, 9 pages.

Liu, W. et al., "A robust cascaded strategy of in-motion alignment for inertial navigation systems." International Journal of Distributed Sensor Networks, vol. 13, No. 9, Sep. 2017, 12 pages.

Falco, G. et al., "Loose and Tight GNSS/INS Integrations: Comparison of Performance Assessed in Real Urban Scenarios," Sensors, vol. 17, No. 255, Jan. 29, 2017, 25 pages.

Falco, G. et al., "Positioning Based on Tightly Coupled Multiple Sensors: A Practical Implementation and Experimenta Assessment," IEEE Access, vol. 6, Mar. 2018, 16 pages.

Groves, P., "Initialization and Alignment," Chapter 5, Principles of GNSS, Inertial, and Multisensor Integrated Navigatic Systems, Second Edition ,Artech House, 2013, pp. 195-203.

Groves, P., "INS Alignment, Zero Updates, and Motion Constraints," Chapter 15, Principles of GNSS, Inertial, and Multisensor Integrated Navigation Systems, Second Edition , Artech House, 2013, pp. 627-637.

Groves, P., "Kalman Filter-Based Estimation," Chapter 3, Principles of GNSS, Inertial, and Multisensor Integrated Navigation Systems, Second Edition , Artech House, 2013, pp. 81-113.

Groves, P. et al., "Kalman Filter-Based Estimation," Chapter 3, Principles of GNSS, Inertial, and Multisensor Integrated Navigation Systems, Second Edition , Artech House, 2013, pp. 118-130.

Groves, P. "Attitude Measurement," Chapter 6, Principles of GNSS, Inertial, and Multisensor Integrated Navigation Systems, Second Edition , Artech House, 2013, pp. 225-227.

Groves, P., "MultisensorIntegrated Navigation," Chapter 16, Principles of GNSS, Inertial, and Multisensor Integrated Navigation Systems, Second Edition , Artech House, 2013, pp. 647-673.

* cited by examiner

METHOD FOR DETERMINING THE POSITION AND ORIENTATION OF A VEHICLE

The invention relates to a method and system for determining the position and orientation of a vehicle. The invention also relates to a data storage medium for implementing this method.

Many methods for determining the position and orientation of a vehicle are known. For example, a presentation of the prior art on the matter may be found in the following thesis: S. Godha, *"Performance Evaluation of Low Cost MEMS-Based IMU Integrated With GPS for Land Vehicle NAVIGATION Application"*, PhD report, 2006. Below, this thesis is designated by the expression "Godha2006". Prior art is also known from US2009/326740A1, US2018/017390A1 and from the article by Syed ZAINAB et al.: "Economical and Robust Inertial Sensor Configuration for a Portable Navigation System", GNSS 2007—Proceedings of the 20th international technical meeting of the satellite division of the institute of navigation, USA, 28 Sep. 2007, pages 2129-2135.

Conventionally, a module for integrating inertial measurements constructs an estimated position $P_e$ and an estimated orientation $O_e$ of the vehicle from:
measurements from an accelerometer and gyrometer located on-board the vehicle, and
the previous position and the previous orientation determined for this vehicle.

Next, this estimated position $P_e$ and this estimated orientation $O_e$ are corrected by a correcting module to obtain a corrected position $P_c$ and a corrected orientation $O_c$. The corrected position $P_c$ and the corrected orientation $O_c$ are more accurate and are delivered to an output of the locating system by way of position and orientation determined for the vehicle. This corrected position $P_c$ and this corrected orientation $O_c$ are also acquired by the integrating module and then used by this integrating module by way of previous position and previous orientation, respectively, to construct the next estimated position and orientation of the vehicle.

The correcting module corrects the position $P_e$ and orientation $O_e$ by taking into account measurements from sensors other than those of the on-board accelerometer and gyrometer. In particular, the measurements of a satellite geopositioning unit and, optionally, the measurements of other sensors are used by the correcting module for this purpose. Such a method for determining the position and orientation of a vehicle is for example disclosed in patent application US2009/326740.

Moreover, the measurements taken into account by the correcting module very often comprise a measurement of the yaw angle of the vehicle taken by another sensor and different from the estimation of this angle contained in the estimated orientation $O_e$. Below, this measured yaw angle is denoted $\psi_m$. The yaw angle $\psi_m$ is different from the one deducible from the orientation $O_e$.

The angle $\psi_m$ may be obtained in various ways. For example, it may be obtained from the speed measurements of the satellite geopositioning unit. In the latter case, "GNSS heading" is spoken of. The angle $\psi_m$ may also be obtained from measurements of a magnetometer.

The invention aims to improve these known methods for determining the position and the orientation of the vehicle so that they converge more quickly to an accurate position and orientation of the vehicle.

One subject thereof is therefore a method for determining the position and orientation of a vehicle.

Another subject of the invention is a data storage medium that is readable by a microprocessor, comprising instructions for carrying out the above method, when these instructions are executed by a microprocessor.

Lastly, another subject of the invention is a locating system configured to implement the above method.

The invention will be better understood on reading the following description, which is given solely by way of non-limiting example, and with reference to the drawings, in which.

In these figures, the same references have been used to designate the same elements.

In the remainder of this description, features and functions that are well known to a person skilled in the art are not described in detail. In particular, with respect to the general knowledge of those skilled in the art of systems for locating a vehicle using a satellite geopositioning unit and an inertial navigation unit, the reader is referred, for example, to the thesis Godha2006.

In this description, detailed examples of embodiments are first described in section I with reference to the figures. Next, in the following section, Section II, variants of these embodiments are presented. Lastly, the advantages of the various embodiments are presented in section III.

Section I: Examples of Embodiments

Figure 1:
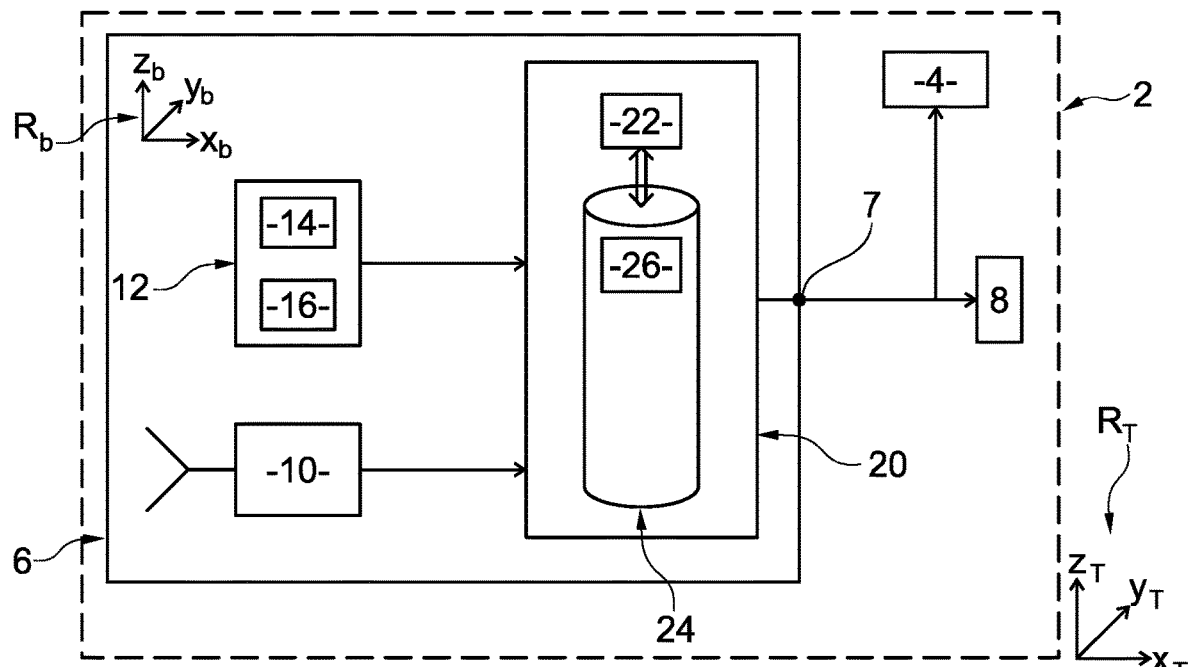
FIG. 1 is a schematic illustration of a system for locating a vehicle.

FIG. 1 shows a motor vehicle 2 capable of moving over the ground. For this purpose, it typically comprises wheels or tracks. The vehicle 2 is also equipped with propulsion means 4 such as an engine that drives the wheels or tracks.

The vehicle 2 is also provided with a system 6 for locating this vehicle. This system 6 is able to determine the position, orientation and speed of the vehicle 2 in a terrestrial frame of reference $R_T$. Here, the terrestrial frame of reference $R_T$ is fixed without any degree of freedom to the Earth. The frame of reference $R_T$ comprises three axes, which are typically orthogonal to one another. A moving frame of reference $R_b$ is also fixed with no degree of freedom to the vehicle 2. This frame of reference $R_b$ comprises three axes that are orthogonal to one another, denoted $x_b$, $y_b$ and $z_b$, respectively. Conventionally, when the vehicle 2 moves horizontally, the axes $x_b$ and $y_b$ are in a horizontal plane and the axis $z_b$ is vertical. Here the axis $x_b$ is oriented and points in the direction in which the vehicle moves when it moves forward.

Here, the position of the vehicle 2 in the frame of reference $R_T$ is expressed by the latitude L, the longitude A and the altitude h of the origin of the frame of reference $R_b$.

The orientation of the vehicle 2 is expressed by the yaw angle $\psi$, the pitch angle $\theta$ and the roll angle $\phi$ of the frame of reference $R_b$ with respect to the frame of reference $R_T$. In practice, most often, the orientation of the vehicle takes the form of an orientation matrix from which it is possible to deduce the yaw angle, the pitch angle and the roll angle of the vehicle. The orientation of the vehicle may also take the form of a vector directly comprising the yaw angle, the pitch angle and the roll angle of the vehicle. Below, these two particular cases will be considered to be equivalent and hence the orientation of the vehicle will be considered to comprise the yaw angle, the pitch angle and the roll angle of the vehicle if these three angles can be deduced directly from a matrix or a vector.

The position, orientation and speed determined by the system 6 are delivered to an output 7.

Typically, the vehicle 2 comprises a control unit 8 for guiding or assisting in guiding the vehicle 2 to a predefined destination. The unit 8 is connected to the output 7. The control unit 8 may be manual and/or automatic. In the case of a manual control unit, the determined position, orientation and speed are transmitted to a human-machine interface with a view to assisting a human being in controlling the propulsion means 4. In the case of an automatic control unit, the determined position, orientation and speed are automatically converted into commands for controlling the propulsion means 4, then automatically transmitted to these propulsion means 4.

The system 6 comprises a satellite geopositioning unit 10 and an inertial measurement unit 12. The unit 10 is what is called a GNSS (acronym of Global Navigation Satellite System). From the satellite signals that it receives, the unit 10 generates signals representative of the position and speed of the vehicle in the frame of reference $R_T$. The unit 10 is here a single-antenna geopositioning unit and not a multi-antenna geopositioning unit. The unit 10 is therefore incapable of measuring the absolute orientation of the vehicle 2 in the frame of reference $R_T$ from the signals transmitted by the satellites.

The unit 12 is what is called an IMU (acronym of Inertial Measurement Unit). The unit 12 notably comprises a triaxial accelerometer 14 and a triaxial gyrometer 16. By virtue of these sensors, the unit 12 is capable of measuring the variation in the orientation of the vehicle 2. In contrast, the unit 12 is also incapable of directly measuring the orientation of the vehicle 2 in the frame of reference $R_T$. Here, the measurement axes of the accelerometer 14 and of the gyrometer 16 are coincident with the axes $x_b$, $y_b$ and $z_b$ of the frame of reference $R_b$, respectively. In addition, the accelerometer 14 is arranged so that a positive measurement of the acceleration of the vehicle 2 along the axis $x_b$ means that vehicle 2 is accelerating while moving forward.

To determine the position, orientation and speed of the vehicle 2 from the measurements of the units 10 and 12, the system 6 comprises a programmable electronic computer 20. This computer 20 is able to acquire the measurements of the units 10 and 12 and, from these measurements, to determine the position, orientation and speed of the vehicle 2 in the frame of reference $R_T$. The computer 20 comprises a microprocessor 22 and a memory 24 comprising the instructions and data required to implement the method described with reference to FIG. 3.

More precisely, the memory 24 comprises the instructions of a software module 26 able to determine the position, orientation and speed of the vehicle 2 from the measurements of the units 10 and 12 when it is executed by the microprocessor 22. The module 26 notably implements a fusing algorithm that establishes, from a previous estimation of the position, orientation and speed of the vehicle 2 and new measurements of the units 10 and 12 acquired since this previous estimation, a new estimation of the position, orientation and speed of the vehicle 2. The fusing algorithm also establishes margins of error in each new estimation.

The general principles of fusing algorithms are well known to those skilled in the art. For example, the interested reader may once again refer to the previously cited thesis Godha2006. Typically, this fusing algorithm implements one or more Kalman filters. Here, the module 26 employs an architecture known as a "closed loop integration scheme" or "closed loop approach".

Figure 2:
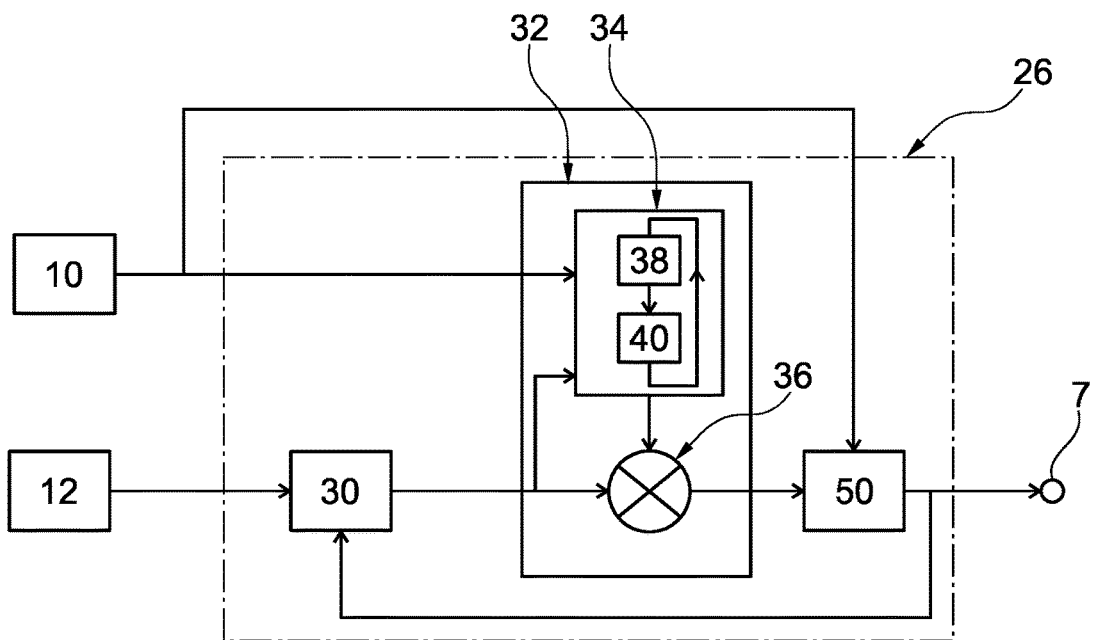
FIG. 2 is a schematic illustration of various software modules implemented in the system of FIG. 1.

FIG. 2 shows in more detail the architecture of the module 26. The module 26 comprises a sub-module 30 for integrating inertial measurements and a correcting sub-module 32. Such sub-modules 30 and 32 are known. For example, for a detailed description of various possible embodiments of these sub-modules, the reader may consult chapter 4 of the thesis Godha2006. Thus, below, only the details required to understand the invention are described in detail.

The sub-module 30 is also known as the "mechanization". For each time k, the sub-module 30 constructs a raw estimation of a position $P_e(k)$, orientation $O_e(k)$ and speed $V_e(k)$ of the vehicle 2. Each position $P_e(k)$, orientation $O_e(k)$ and speed $V_e(k)$ of the vehicle 2 is a vector containing three coordinates. The coordinates of the position $P_e(k)$ in the frame of reference $R_T$ are denoted $x_e(k)$, $y_e(k)$ and $z_e(k)$. The coordinates of the orientation $O_e(k)$ are denoted $\psi_e(k)$, $O_e(k)$ and $\varphi_e(k)$. The successive times k are separated from one another by a period $T_e$. The time immediately preceding the time k is denoted k−1.

The sub-module 30 constructs position $P_e(k)$, orientation $O_e(k)$ and speed $V_e(k)$ from
- the previous position $P_d(k-1)$, the previous orientation $O_d(k-1)$ and the previous speed $V_d(k-1)$, i.e. the position, orientation and speed determined for the vehicle 2 at the time k−1 by system 6, and
- measurements of the accelerometer 14 and of the gyrometer 16 acquired by the sub-module 30 since the time k−1.

The combination of sub-module 30 and of the unit 12 forms what is known as an INS (acronym of Inertial Navigation System).

The sub-module 32 corrects the position $P_e(k)$, orientation $O_e(k)$ and speed $V_e(k)$ constructed by sub-module 30 to obtain a corrected position $P_c(k)$, a corrected orientation $O_c(k)$ and a corrected speed $V_c(k)$. The position, orientation and speed are corrected depending on the measurements of the unit 10. To this end, the sub-module 32 comprises a Kalman filter 34 and an adder 36. Here, the filter 34 is an error-state Kalman filter because it estimates corrections to be made to the position, orientation and speed estimated by the sub-module 30. Thus, the filter 34 establishes, for each time k, a state vector $X_{k|k}$. The state vector $X_{k|k}$ notably contains correction coefficients for the position $P_e(k)$, orientation $O_e(k)$ and speed $V_e(k)$. The adder 36 combines the correction coefficients established by the filter 34 with the position $P_e(k)$, orientation $O_e(k)$ and speed $V_e(k)$ to obtain the corrected position $P_c(k)$, the corrected orientation $O_c(k)$ and the corrected speed $V_c(k)$.

For example, here, the state vector $X_{k|k}$ contains correction coefficients $\delta_x(k)$, $\delta_y(k)$ and $\delta_z(k)$ for the coordinates $x_e(k)$, $y_e(k)$ and $z_e(k)$ of the position $P_e(k)$, respectively. The adder 36 adds these coefficients $\delta_x(k)$, $\delta_y(k)$ and $\delta_z(k)$ to the coordinates $x_e(k)$, $y_e(k)$ and $z_e(k)$ to get the coordinates $x_c(k)$, $y_c(k)$ and $z_c(k)$ of the corrected position $P_c(k)$, respectively.

The state vector $X_{k|k}$ also contains correction coefficients $\delta_\psi(k)$, $\delta_\theta(k)$ and $\delta_\varphi(k)$ for the coordinates $\psi_e(k)$, $\theta_e(k)$ and $\varphi_e(k)$ of the orientation $O_e(k)$, respectively. The adder 36 adds these coefficients $\delta_\psi(k)$, $\delta_\theta(k)$ and $\delta_\varphi(k)$ to the coordinates $\psi_e(k)$, $\theta_e(k)$ and $\varphi_e(k)$ to obtain the corrected coordinates $\psi_c(k)$, $\theta_c(k)$ and $\varphi_c(k)$ of the orientation $O_c(k)$, respectively.

Conventionally, the state vector $X_{k|k}$ also contains correction coefficients for correcting other parameters, such as the speed $V_e(k)$, measurement biases of the accelerometer 14 and gyrometer 16, inter alia.

The filter 34 is a recursive algorithm that, at each time k, supplies the adder 36 with a new state vector $X_{k|k}$ computed from:
- the previous state vector $X_{k-1|k-1}$,
- measurements of the unit 10 acquired since the time k−1, and
- the position $P_e(k)$, orientation $O_e(k)$ and speed $V_e(k)$ constructed by sub-module 30.

In contrast, the filter 34 does not acquire and exploit a measurement of the yaw angle $\psi_m$ directly. In other words, the filter 34 does not receive and does not use a yaw-angle measurement obtained from measurements of a sensor other than the unit 12.

Conventionally, the filter 34 comprises a block 38 for predicting a state vector $X_{k|k-1}$ and a block 40 for updating the predicted vector $X_{k|k-1}$. These blocks are executed one after the other for each vector $X_{k|k}$.

More precisely, block 38 constructs a prediction $X_{k|k-1}$ of the state vector from the previous state vector $X_{k-1|k-1}$.

Here, an example of embodiment of the blocks 38 and 40 is described in the particular case where filter 34 is a linear Kalman filter.

The equation used to propagate or predict the state of the filter 34 by the block 38 is defined by the following relationship, relationship (1): $X_{k|k-1} = A_{k-1} X_{k-1|k-1} + v$, where:
- $X_{k-1|k-1}$ is the estimation of the state vector at the time k−1 that is obtained taking into account all the measurements up to the time k−1,
- $X_{k|k-1}$ is the prediction of the state vector at the time k that is obtained by taking into account all the measurements up to the time k−1 but without taking into account the measurements taken at the time k,
- $AT_{k-1}$ is the state transition matrix,
- v is the process noise.

The equation used to propagate or predict the error covariance matrix by the block 38 is defined by the following relationship, relationship (2): $P_{k|k-1} = A_{k-1} P_{k-1|k-1} AT_{k-1}^T$ where:
- $P_{k-1|k-1}$ is the estimation of the error covariance matrix at the time k−1 that is obtained taking into account all the measurements up to the time k−1,
- $P_{k|k-1}$ is the estimation of the covariance matrix $P_k$ at the time k that is obtained only taking into account the measurements up to the time k−1,
- $Q_{k-1}$ is the covariance matrix of the process noise v.

The block 40 corrects the prediction $X_{k|k-1}$ of the state vector so as to obtain the state vector $X_{k|k}$. The corrected vector $X_{k|k}$ is constructed depending on a difference $Y_k$ between:
- an estimation $\hat{z}_k$ of the measurements of physical quantities at the time k, which estimation is constructed from the prediction $X_{k|k-1}$ delivered by the block 38, and
- measurements $z_k$ of these physical quantities taken at the time k.

The difference $Y_k$ is known as "innovation". Here, the measured physical quantities are differences in position and speed. No difference between a measurement of the angle $\psi_m(k)$ and its estimation is used.

The estimation $\hat{z}_k$ is obtained using the following relationship, relationship (3): $\hat{z}_k = H_k X_{k|k-1}$, where $H_k$ is the measurement matrix.

The measurements $z_k$ are obtained from the difference between the position $P_e(k)$ and speed $V_e(k)$ and a position $P_{GPS}(k)$ and speed $V_{GPS}(k)$ obtained only from the measurements of the unit 10, respectively.

The innovation $Y_k$ is obtained using the following relationship, relationship (4): $Y_k = z_k - \hat{z}_k$.

Typically, the block 40 corrects the prediction $X_{k|k-1}$ by adding the innovation $Y_k$ multiplied by the Kalman gain $K_k$. The gain $K_k$ is computed using the following relationship, relationship (5): $K_k = P_{k|k-1} H_k^T (H_k P_{k|k-1} H_k^T + R_k)^{-1}$, where the matrix $R_k$ is the covariance matrix of the noise in the measurements.

Next, the state vector $X_{k|k}$ is obtained using the following relationship, relationship (6): $X_{k|k} = X_{k|k-1} + K_k Y_k$.

The updated error covariance matrix at the time k is computed using the following relationship, relationship (7): $P_{k|k} = (I - K_k H_k) P_{k|k-1}$, where I is the identity matrix. The matrix $P_{k|k}$ contains the margins of error in the estimations of the correction coefficients. Thus, it in particular contains the margins of error in the estimation of the coefficients $\delta_\psi(k)$, $\delta_\theta(k)$ and $\delta_\varphi(k)$.

In this particular embodiment, the adder 36 is a simple adder that adds, to the position $P_e(k)$, orientation $O_e(k)$ and speed $V_e(k)$, the corresponding correction coefficients contained in the state vector $X_{k|k}$. Next, the adder 36 delivers to an output of the sub-module 32 the corrected position $P_c(k)$, orientation $O_c(k)$ and speed $V_c(k)$ thus obtained.

The module 26 also comprises a substituting sub-module 50. The sub-module 50 notably acquires the position $P_c(k)$, orientation $O_c(k)$ and speed $V_c(k)$ delivered by the correcting sub-module 32. Next, it delivers, to the output 7 of the system 6, a position $P_d(k)$, an orientation $O_d(k)$ and a speed $V_d(k)$ by way of position, orientation and speed of the vehicle 2 determined by the system 6 for the time k, respectively. The operation of the sub-module 50 is described in more detail with reference to the method of FIG. 3.

The position $P_d(k)$, orientation $O_d(k)$ and speed $V_d(k)$ are also acquired by the integrating sub-module 30 which uses them as the previous position, previous orientation and previous speed to construct the estimated position $P_e(k+1)$, orientation $O_e(k+1)$ and speed $V_e(k+1)$.

The use of the system 6 is broken down into successive periods of activity separated from one another by periods of inactivity. During these periods of inactivity, the system 6 is not active, i.e. it does not determine the position and orientation of the vehicle 2. Typically, during the periods of inactivity, the units 10 and 12 do not perform any measurements and do not transmit any measurements to the computer 20. The computer 20 therefore does not perform any processing on these measurements. These periods of inactivity generally last several minutes, several hours or several days. For example, during the periods of inactivity, the system 6 is switched off or on standby.

In contrast, during each period of activity, the units 10 and 12 deliver new measurements to the computer 20, which processes them to determine the position, orientation and speed of the vehicle 2 depending on these new measurements. These periods of activity come one after the other in succession and are each separated from one another by a period of inactivity of variable length.

The operation of the system 6 during one of these periods of activity will now be described with reference to the method of FIG. 3.

The period of activity begins with a phase 48 of initializing the system 6. This phase 48 begins immediately after the activation of the system 6, i.e. typically just after it has been powered up. In this phase 48, various variables are initialized such as, for example, the initial estimations of the yaw, roll and pitch angles. There are algorithms that allow an initial estimation of the roll and pitch angles and other desired parameters to be rapidly obtained. For example, the initial estimation of the roll and pitch angles is obtained from the measurements of the accelerometer 14. In phase 48, a correction coefficients for the measurements of the accelerometer 14 and of the gyrometer 16 may also be initialized.

The yaw angle is also initialized. However, at this stage, it is very difficult to obtain an initial estimation of the yaw angle in the absence of another sensor capable of directly and reliably measuring this angle. Thus, here, the initial value of the yaw angle is chosen arbitrarily. For example, the yaw angle is systematically initialized to the value of zero. To take into account the high uncertainty in this initial estimation of the yaw angle, the margin of error in this initial estimation is initialized to a high value. Here, the margin of error in the estimation of the yaw angle is represented by the standard deviation $\sigma_\psi$. The initial value $\sigma_\psi(0)$ of the standard deviation $a_\psi$ is therefore here initialized to a value higher than 60° or 90° or 180°. Here, the value $a_\psi(0)$ is initialized with the value 180°. The standard deviation $\sigma_\psi$ is equal to the standard deviation $\sigma_{\delta\omega}$ of the estimation of the coefficient $\delta_\psi$. Therefore, the initial margin of error $\sigma_{\delta\psi}(0)$ in the coefficient $\delta_\psi(0)$ is set equal to 180°. The coefficient corresponding to the margin of error in the coefficient $\delta_\psi(0)$ in the matrix $P_{0|0}$ is therefore initialized depending on this initial margin of error $\delta_{\delta\psi}(0)$.

Once the initializing phase 48 has ended, a phase 70 of executing the module 26 begins. This phase 70 then lasts to the end of the period of activity and therefore to the start of the next period of inactivity.

In phase 70, the fusing algorithm is repeatedly executed by module 26. For example, each time that new measurements of the unit 10 and/or of the unit 12 are acquired at the time k by the computer 20, the fusing algorithm is executed to update the estimation of the position, orientation and speed of the vehicle 2 at this time k.

Each time the fusing algorithm is executed, in a step 72, the module 26 establishes:
- new estimations of the position $P_c(k)$, orientation $O_c(k)$ and speed $V_c(k)$ of the vehicle 2, and
- new margins of error in these new estimations of position, orientation and speed.

Step 72 comprises an operation 74 in which the accelerometer 14 and the gyrometer 16 measure the acceleration and the angular velocity of the vehicle at the time k, respectively. Next, in the operation 74, the sub-module 30 constructs the estimations $P_e(k)$, $O_e(k)$ and $V_e(k)$ from:
- the previous position $P_d(k-1)$, the previous orientation $O_d(k-1)$ and the previous speed $V_d(k-1)$, and
- the measurements of the accelerometer 14 and of the gyrometer 16 taken at the time k.

In an operation 76, the unit 10 measures the position and speed of the vehicle 2 at the time k. Next, in the operation 76, the sub-module 32 corrects the position $P_e(k)$, orientation $O_e(k)$ and speed $V_e(k)$ to obtain the corrected position $P_c(k)$, the corrected orientation $O_c(k)$ and the corrected speed $V_c(k)$.

More precisely, in the operation 76, the block 38 constructs the predictions $X_{k|k-1}$ and $P_{k|k-1}$. To do this, the block 38 uses relationships (1) and (2) described above. Therefore, the block 38 does not use the measurements of the unit 10 taken at the time k. Next, the block 40 obtains the state vector $X_{k|k}$ and the matrix $P_{k|k}$ using relationships (3) to (7) described above. Therefore, the block 40 uses the measurements of the position and speed of the vehicle 2 taken by unit 10 at the time k.

Lastly, the adder 36 adds the correction coefficients contained in the vector $X_{k|k}$ to the corresponding coordinates of the position $P_e(k)$, orientation $O_e(k)$ and speed $V_e(k)$ to obtain the position $P_c(k)$, orientation $O_c(k)$ and speed $V_c(k)$. The orientation $O_c(k)$ therefore contains, at this stage, a corrected yaw angle $\psi_c(k)$, a corrected pitch angle $\theta_c(k)$ and a corrected roll angle $\varphi_c(k)$. The matrix $P_{k|k}$ contains a coefficient $\sigma_{\delta\psi}(k)^2$ that represents the margin of error in the coefficient $\delta_\psi(k)$.

In parallel, after or before step 72, in a step 80, the sub-module 50 obtains the yaw angle $\psi_m(k)$ measured at the time k. Here, the angle $\psi_m(k)$ is obtained from the measurements $v_{east}(k)$ and $v_{north}(k)$ of the speed of the vehicle 2 in the directions pointing east and north, respectively. Here, the speeds $v_{east}(k)$ and $v_{north}(k)$ are delivered by unit 10 to module 26 directly. The angle $\psi_m(k)$ thus obtained is different from the yaw angle contained in the orientations $O_e$ and $O_c$.

Thus, step 80 begins with an operation 82 in which the computer 20 acquires the measurements $v_{east}(k)$ and $v_{north}(k)$ delivered by unit 10 at the time k.

Next, in an operation 84, the sub-module 50 computes an angle $\alpha$ using the following relationship: $\alpha = a\tan(v_{east}(k)/v_{north}(k))$, where the symbol "a tan" denotes the arc-tangent function.

It is not possible to know from the measurements $v_{east}(k)$ and $v_{north}(k)$ whether the vehicle 2 is moving forward or backward. Thus, in an operation 86, the sub-module 50 detects whether the vehicle is moving backward. To do this, when vehicle 2 is stationary, the component $v_{xb}$ of the speed of the vehicle 2 along the axis $x_b$ is initialized to zero. The component $a_{xb}$ of the acceleration of the vehicle 2 measured by the accelerometer 14 is also initialized to zero. Next, each time the computer 20 acquires a new measurement from the accelerometer 14, the sub-module 50 computes the speed $v_{xb}(k)$ of the vehicle 2 along the axis $x_b$ using the following relationship: $v_{xb}(k) = v_{xb}(k-1) + (a_{xb}(k) - b_{ax})T_e$, where:
- $v_{xb}(k-1)$ is the previous speed of the vehicle 2 along the axis $x_b$ computed at the time k−1
- $a_{xb}(k)$ is the acceleration of the vehicle 2 along the axis $x_b$ constructed from the measured acceleration, along the axis $x_b$, at the time k by the accelerometer 14,
- $b_{ax}$ is a correction coefficient initialized in phase 48 to correct a measurement bias of the accelerometer 14 along the axis $x_b$, and
- $T_e$ is the duration of the time interval between the times k and k−1.

Preferably, the value $a_{xb}(k)$ is constructed so as to minimize or eliminate the contribution of Earth's gravity to the acceleration measured by the accelerometer 14. For example, the value $a_{xb}(k)$ is constructed by filtering, using a high-pass filter, the measurements of the accelerometer 14 or by averaging, in a moving window, the measurements of the accelerometer 14.

If the speed $v_{xb}(k)$ thus computed is higher than a preset threshold $S_1$, then the sub-module 50 detects that the vehicle 2 is moving forward. To this end, the threshold $S_1$ is higher than or equal to zero. For example, here the threshold $S_1$ is equal to zero. If, on the contrary, the speed $v_{xb}(k)$ is lower than $-S_1$, then the module 50 detects that the vehicle 2 is moving backward.

If the sub-module 50 detects that the vehicle 2 is moving forward, in a step 88, the angle $\psi_m(k)$ is set equal to the computed angle $\alpha$.

In contrast, in an operation 90, if the sub-module 50 detects that the vehicle 2 is moving backward, the angle $\psi_m(k)$ is set equal to $\alpha + \pi$ rad.

Lastly, in an operation 92, the sub-module 50 computes the margin of error $\sigma_{\psi m}(k)$ in the measurement of yaw angle taken. For example, to do this, the sub-module 50 uses the following relationship:

$$\sigma_{\Psi m}(k) = \frac{\sqrt{(v_{north}(k)\sigma_{north}(k))^2 + (vv_{east}(k)\sigma_{east}(k))^2}}{v_{east}(k)^2 + v_{north}(k)^2}$$

where:
- $\sigma_{east}(k)$ and $\sigma_{north}(k)$ are the standard deviations of the measurements of the speeds $v_{east}(k)$ and $v_{north}(k)$, respectively.

Here, the standard deviations $\sigma_{east}(k)$ and $\sigma_{north}(k)$ are supplied by the unit 10, at the same time as the latter supplies the speeds $v_{east}(k)$ and $V_{north}(k)$.

Once the sub-module 50 has obtained the position $P_c(k)$, orientation $O_c(k)$ and speed $V_c(k)$ and the angle $\psi_m(k)$, in a step 100 it verifies the appropriateness of using the angle $\psi_m(k)$ instead of the angle $\psi_c(k)$.

Here, it considered to be appropriate to use the angle $\psi_m(k)$ instead of the angle $\psi_c(k)$ if this allows the orientation determined for the vehicle 2 to be improved. To do this, in step 100, the sub-module 50 verifies whether a preset first set of conditions is met. If this first set of conditions is not met, then it is considered to be appropriate to use the angle $\psi_m(k)$ instead of the angle $\psi_c(k)$.

Here, this first set of conditions comprises one or more preset conditions. In the present case, the set of conditions is considered to be met if at least one of the preset conditions of this first set of conditions is met. In this embodiment, by way of example, the conditions of the first set of conditions are chosen from the group consisting of the following conditions:

$\sigma_{\psi m}(k) > (1/\beta)\sigma_{\psi c}(k)$,     condition (11):

$\sigma_{\psi c}(k) < S_{12}$,     condition (12):

$|\psi_m(k) - \psi_c(k)| < S_{13}$,     condition (13):

condition (14):

$$\frac{1}{(N+1)}\sum_{i=k-N}^{i=k}|\Psi_m(i) - \Psi_c(i)| < S_{14}$$

where:
- N is a preset constant higher than two or four or ten and lower, generally, than one hundred, fifty or twenty,
- i is an integer index that varies between k–N and k
- $\sigma_{\psi m}(i)$ is the standard deviation of the measurement of the angle $\psi_m(i)$,
- $\sigma_{\psi c}(k)$ is the standard deviation of the corrected angle $\psi_c(k)$,
- β is a constant higher than or equal to one and generally lower than or equal to 100 or 50, and preferably comprised between 1 and 10,
- the thresholds $S_{12}$, $S_{13}$ and $S_{14}$ are preset constants,
- the symbol | . . . | designates the absolute value of the term between the vertical bars.

The margin of error in the angle $\psi_c(k)$ is equal to the margin of error in the coefficient $\delta_\psi(k)$. Thus, the standard deviation $\sigma_{\psi c}(k)$ is equal to the standard deviation $\sigma_{\delta\psi c}(k)$ in the estimation of the coefficient $\delta\omega_c(k)$. The standard deviation $\sigma_{\delta\psi c}(k)$ is obtained from the coefficient of the covariance matrix $P_{k|k}$ established by the filter 34 and corresponding to the margin of error in the coefficient $\delta_\psi(k)$.

The thresholds $S_{12}$, $S_{13}$ and $S_{14}$ are typically higher than 1°. Preferably, they are comprised between 1° and 15° or between 1° and 10°.

When the first set of conditions is not met, the method continues with a step 102. In contrast, when this first set of conditions is met, the method continues with a step 104.

In step 102, the sub-module 50 merely replaces the angle $\psi_c(k)$ with the angle $\psi_m(k)$ to obtain the orientation $O_d(k)$. In this step 102, the sub-module 50 leaves unchanged, notably, the position $P_c(k)$, the speed $V_c(k)$ and the corrected roll and pitch angles. Thus, the position $P_d(k)$ and the speed $V_d(k)$ delivered by the sub-module 50 are identical to the position $P_c(k)$ and speed $V_c(k)$, respectively.

In step 104, in contrast, the sub-module 50 does not replace the angle $\psi_c(k)$ with the angle $\psi_m(k)$. Thus, in this case, the position $P_d(k)$, orientation $O_d(k)$ and speed $V_d(k)$ are equal to the position $P_c(k)$, orientation $O_c(k)$ and speed $V_c(k)$, respectively.

At the end of steps 102 and 104, in a step 106, the sub-module 50 delivers, to the output 7, the position $P_d(k)$, orientation $O_d(k)$ and speed $V_d(k)$.

In parallel, in a step 108, the sub-module 30 acquires the position $P_d(k)$, orientation $O_d(k)$ and speed $V_d(k)$. Next, the sub-module 30 uses this position $P_d(k)$, this orientation $O_d(k)$ and this speed $V_d(k)$ by way of previous position, previous orientation and previous speed to construct the next position $P_e(k+1)$, the next orientation $O_e(k+1)$ and the next speed $V_e(k+1)$, respectively.

When the system 6 starts up, the margin of error $\sigma_{\psi c}(k)$ in the angle $\psi_c(k)$ is large. Thus, generally, the first set of conditions is not met during a transitional phase which is just after the start of the system 6. Thus, in this transient phase, the system 6 delivers the orientation $O_d(k)$ in which the angle $\psi_c(k)$ has been replaced by the angle $\psi_m(k)$. This allows a more accurate orientation of the vehicle to be obtained during this transient phase.

At the same time, the measurement $\psi_m(k)$ is not transmitted to the filter 34 and is not used by the filter 34 to construct the state vector $X_{k|k}$ that allows the position, orientation and speed estimated by sub-module 30 to be corrected. In particular, the angle $\psi_m(k)$ is not used by the block 40. Thus, the difference between the angles $\psi_c(k)$ and $\psi_m(k)$ is not taken into account to correct the position $P_e(k)$, orientation $O_e(k)$ and speed $V_e(k)$ delivered by the sub-module 30 during this transient phase. In contrast, during the transient phase, the angle $\psi_m(k)$ is taken into account in the next estimation of the position, orientation and speed of the vehicle via the feedback of step 108.

As explained below, with reference to the graphs of FIGS. 4 and 5, with respect to a conventional use of the angle $\psi_m(k)$, this particular use of the angle $\psi_m(k)$ allows convergence of the system 6 to an accurate and stable orientation of the vehicle 2 to be accelerated.

Figure 3:
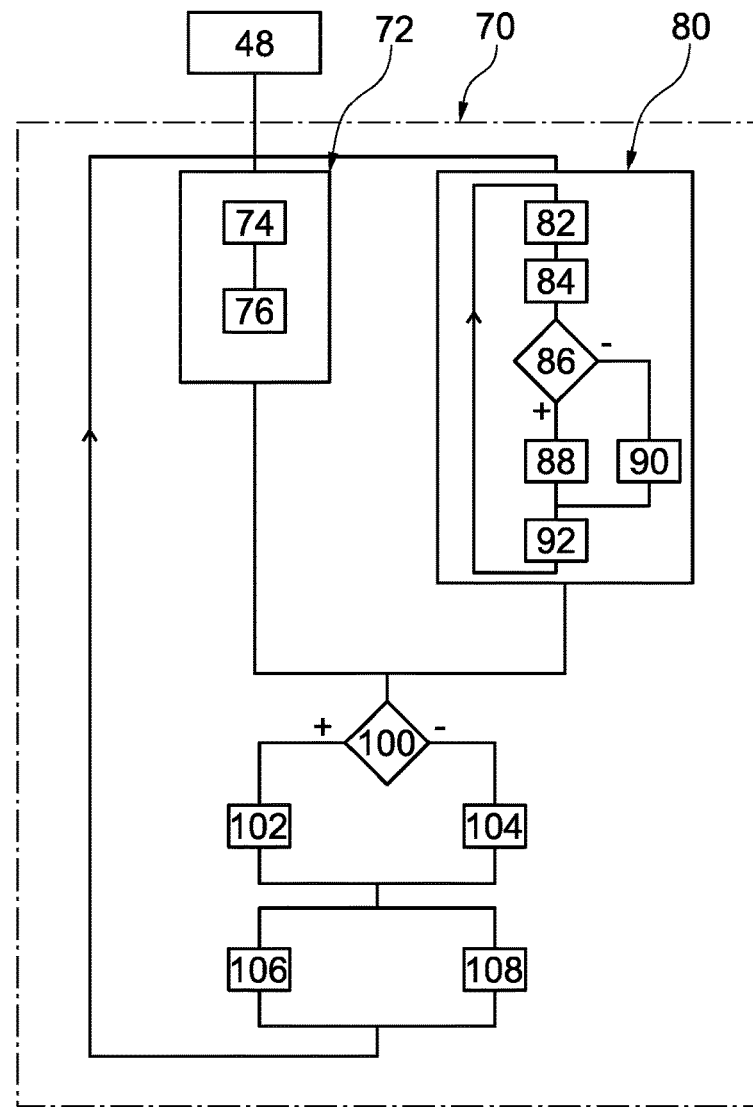
FIG. 3 is a flowchart of a method for determining the position and orientation of a vehicle using the system of FIG. 1.

Next, once the margin of error in the angle $\psi_c(k)$ is sufficiently small, in the case of the method of FIG. 3, the angle $\psi_m(k)$ is no longer used to determine the orientation of the vehicle. No longer using the angle $\psi_m(k)$ once the first set of conditions is met allows an estimation of the yaw angle that is more accurate than if the measured angle $\psi_m(k)$ were simply used to be obtained. Specifically, at this stage, the margin of error in the corrected yaw angle is small and the filter 34 then allows an accurate value to be obtained for this angle. In addition, an erroneous measurement of the yaw angle $\psi_m(k)$, for example caused by temporary poor reception of satellite signals by the unit 10, degrades the margin of error in the position, orientation and speed determined for vehicle 2 less rapidly.

Figure 4:
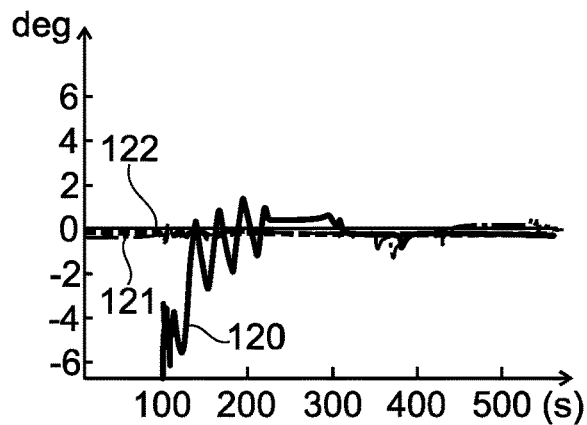
FIGS. 4 and 5 are graphs illustrating the variation over time in the margin of error in orientation determined for the vehicle.

FIG. 4 shows the variation over time in the margins of error in the angles $\psi_c$ (curve 120), $\theta_c$ (curve 121) and $\varphi_c$ (curve 122) in the case where the system 6 is implemented and where the initial difference between the angles $\psi_c(0)$ and $\psi_m(0)$ is equal to −90 degrees.

Figure 5:
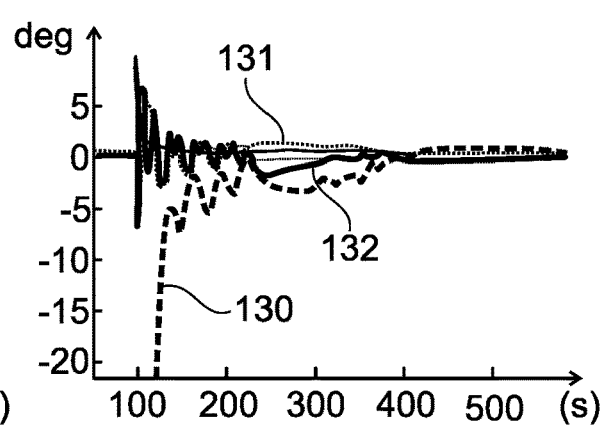

The graph of FIG. 5 corresponds to a conventional locating system. Here, this conventional system is identical to system 6, except that:

the substituting sub-module 50 is omitted, and the measured angle $\psi_m$ is transmitted to the Kalman filter and used by the block 40 to update the state vector $X_{k|k}$ depending on the difference between the predicted yaw angle and the measured yaw angle $\psi_m$ obtained from the measurements of the unit 10.

In FIGS. 4 and 5, the x-axis and the y-axis represent time, expressed in seconds, and the margin of error expressed in degrees, respectively. FIG. 5 shows the variation over time in the margins of error in the yaw angle $\psi_c$ (curve 130), pitch angle $\theta_c$ (curve 131) and roll angle $\varphi_c$ (curve 132) in the case of the conventional system and in the case where the initial difference between the angles $\psi_c$ and $\psi_m$ is also equal to −90 degrees.

In these figures, the vehicle 2 begins to move at the time t=100 seconds.

It may be seen that the margin of error in the estimation of the angles $\theta_c$ and $\varphi_c$ converges much faster to a low value in the case of system 6 than in the case of the conventional system. In addition, with the conventional system, the amplitude of the oscillations of the margins of error in the angles $\theta_c$ and $\varphi_c$ is much higher than in the case of system 6.

The fact that the system 6 converges more rapidly to an accurate vehicle orientation is explained by the following effect. In a conventional system, the fact that the difference between the angles $\psi_m(k)$ and $\psi_c(k)$ is large leads to a major correction of the angle $\psi_c(k)$, but also to correction of other parameters of the state vector $X_{k|k}$ and notably of the predictions of the pitch and roll angles. This is also due to the fact that the system of equations of the filter 34 is obtained assuming that the error in the yaw, pitch and roll angles is always small and therefore small from the start. However, this is not the case in practice. Thus, during the transient phase, the large difference between the angles $\psi_m(k)$ and $\psi_c(k)$ results in a degradation of the accuracy of the estimation of the angles $\theta_c(k)$ and $\varphi_c(k)$. In the system 6, since the difference between the angles $\psi_m(k)$ and $\psi_c(k)$ is not used by filter 34 to correct the various parameters of the state vector $X_{k|k}$, the increase in the margin of error in the angles $\theta_c(k)$ and $\varphi_c(k)$ is avoided.

Section II: Variants

Variants Relating to the Obtainment of the Angle $\psi_m(k)$

There are many other possible embodiments of the step 86 of detecting a backward movement of the vehicle 2. For example, in one particularly simple embodiment, the vehicle comprises a specific sensor that directly detects the direction in which the vehicle 2 is moving. In this case, in step 86, the sub-module 50 acquires the measurements of this specific sensor and detects the backward movement from the measurements of this specific sensor. The specific sensor detects, for example, directly, the passage of the vehicle's gearbox to reverse gear. The specific sensor may also be an odometer that measures the direction and distance traveled by the vehicle 2.

Backward movement may also be detected from the coordinate $v_{xc}(k)$ of the speed $v_c(k)$ established by the sub-module 32. If the speed $v_{xc}(k)$ is negative, it means that the vehicle is moving backward. This embodiment is however highly dependent on the margin of error in the corrected speed $v_c(k)$.

The embodiment of step 86 described with reference to FIG. 3 works well, notably when the pitch and roll angles of the vehicle 2 are practically zero. In the contrary case, it is possible to compensate for the effect of Earth's gravity on the measurement of the acceleration of the vehicle by taking into account the values of the pitch and roll angles.

In another embodiment, the backward movement of the vehicle is detected by testing the following condition: $|\alpha-(\psi_c(k)-\pi)|<|\alpha-(\psi_c(k))|$. If this condition is met, it means that the vehicle is moving backward. In contrast, if this condition is not met, it means that the vehicle 2 is moving forward. In another variant, the term $\psi_c(k)$ under the above condition is replaced by a yaw angle measured by a sensor independent of the unit 10. This additional sensor is for example a triaxial magnetometer.

In a simplified embodiment, the unit 10 does not supply a measurement of the speed of the vehicle, but only its position. In this case, the speeds $v_{east}(k)$ and $v_{north}(k)$ required to compute the angle $\alpha$ are deduced from the successive positions supplied by the unit 10. For example, the speeds $v_{east}(k)$ and $v_{north}(k)$ are obtained using the following relationships:

$$V_{east}(k)=(x_{east}(k)-x_{east}(k-1))/T_e, \text{ and}$$

$$v_{north}(k)=(y_{north}(k)-y_{north}(k-1))/T_e,$$

where:

$x_{east}(k)$ and $y_{north}(k)$ are the positions of the vehicle 2 in the East and North directions provided by unit 10 at the sampling time k, and $x_{east}(k-1)$ and $y_{north}(k-1)$ are the positions of the vehicle in the East and North directions provided by unit 10 at the sampling time k−1, and $T_e$ is the sampling period.

In the above case, the angle $\alpha$ may be computed directly using the following relationship:

$$\alpha = \operatorname{atan}\left(\frac{x_{east}(k) - x_{east}(k-1)}{y_{north}(k) - y_{north}(k-1)}\right)$$

The angle $\psi_m(k)$ may be obtained using sensors other than the unit 10. For example, as a variant, the angle $\psi_m(k)$ is obtained from the measurements of a magnetometer. In this case, the angle $\psi_m(k)$ is, for example, obtained using the following relationship: $\psi_m(k)=-a\tan(b_y(k)/b_x(k))$, where: $b_x(k)$ and $b_y(k)$ are the components of the magnetic field measured in the directions $x_b$ and $y_b$ of the frame of reference $R_b$, respectively.

It will be noted that in the case where the measurement of the angle $\psi_m(k)$ is obtained from a magnetometer, it is not necessary to detect the direction in which the vehicle is moving. Specifically, in this case, the supplied measurement of the angle $\psi_m(k)$ is an absolute measurement. When the measurement of the angle $\psi_m(k)$ is obtained from a sensor other than the unit 10, then the unit 10 is not necessarily used to obtain the angle $\psi_m(k)$. However, it is also possible to combine the measurement of the angle $\psi_m(k)$ obtained from the measurements of the unit 10, with the measurement of the angle $\psi_m(k)$ obtained from other sensors to obtain a more accurate measurement of the angle $\psi_m(k)$.

As a variant, step 82 also comprises an operation of filtering the raw measurements of the speeds $V_{east}(k)$ and $v_{north}(k)$ before using these measurements to compute the angle $\alpha$. In one particularly simple embodiment, the filtering operation simply consists in computing the average of the speeds $v_{east}(k)$ and $v_{north}(k)$ in a moving window.

In another embodiment, the measurements of the unit 10 and gyrometer 16 are combined to obtain a more accurate measurement of the angle $\psi_m(k)$.

As a variant, if unit 10 does not supply the standard deviations $\sigma_{east}(k)$ and $\sigma_{north}(k)$ of the speed measurements $v_{east}(k)$ and $v_{north}(k)$, respectively, then these standard deviations are computed by the sub-module 50.

In the particular case of a vehicle which is unable to move backwards, steps 86 and 90 are omitted and the angle $\psi_m(k)$ is systematically equal to the computed angle $\alpha$.

Variants of Step 100:

As a variant, in step 100, the first set of conditions is considered to be met only if all the conditions of this first set of conditions are met.

The first set of conditions may also comprise additional conditions. For example, it may comprise, in addition to or instead of conditions (11) to (14) described above, the following conditions:
  condition (15): the speed of the vehicle 2, in norm or in a given direction, is higher than a preset threshold $S_{15}$,
  condition (16): the angular velocity of the vehicle 2 is lower than a preset threshold $S_{16}$, and
  condition (17): $\sigma_{\psi m}(k) > S_{17}$, where $S_{17}$ is a constant preset threshold.

In another variant, the first set of conditions comprises a single condition chosen from conditions (11) to (17) described above.

It is also possible to activate the replacement of the angle $\psi_c(k)$ with the angle $\psi_m(k)$ solely once a second set of preset conditions is met. For example, this second set of conditions comprises one or more conditions chosen from the group consisting of the following conditions:
  condition (20): a plurality of measurements of the unit 10 have been acquired,
  condition (21): a static phase of a duration longer than 1 s or 5 s or 10 s has been detected beforehand,
  condition (22): an instruction indicating that the phase 48 has ended successfully has been received,
  condition (23): the time passed from the start of phase 48 to the current time is longer than a preset threshold $S_{23}$, this preset threshold $S_{23}$ typically being higher than 1 s or 5 s.

A static phase is a phase in which the vehicle 2 is stationary in the frame of reference $R_T$. If phase 48 is executed during a static phase, it allows the roll and pitch angles, and the correction coefficients for the measurements of the gyrometer 16, to be accurately initialized.

In one simplified variant, steps 100 and 104 are omitted. In this case, the angle $\psi_c(k)$ is systematically replaced by the angle $\psi_m(k)$ throughout the entire active phase of the system 6.

Variants of the Kalman Filter:

Many other embodiments of the filter 34 are possible. For example, the filter 34 may be a linear Kalman filter, an extended Kalman filter (EKF), an unscented Kalman filter (UKF) or even an adaptive Kalman filter.

Likewise, many variants of the state vector $X_{k|k}$ are possible. For example when the system 6 does not determine the speed of the vehicle, the correction coefficients for the speed of the vehicle are omitted. The state vector $X_{k|k}$ may also not contain a correction coefficient for the biases of the accelerometer 14 and of the gyrometer 16. The state vector $X_{k|k}$ may also contain additional state variables.

What was taught above for the particular case where the correcting sub-module 32 uses one or more Kalman filters also applies to correcting sub-modules that construct the orientation $O_c(k)$ using estimators other than Kalman filters. Generally, what has been described here applies to any correcting module that employs estimators the systems of equations of which have been established assuming that the error in yaw angle is small from the start.

Other Variants:

The system 6 described here may be used in any vehicle that cannot move sideways as a crab would, i.e. in a direction parallel to the axis $y_b$. Thus, the vehicle may also be a train for example.

In the case where the yaw angle is measured using a sensor that provides a measurement of the yaw angle that is not affected by movement in the direction $y_b$, then the vehicle may be any object capable of moving. For example, the vehicle may be an airplane, a boat or ship, a submarine, a missile, a rocket, a smartphone, a laptop or the like.

In one simplified embodiment, the system 2 does not determine the speed of the vehicle 2. In this case, the module 26 may be simplified.

Other embodiments of the sub-module 32 are possible. For example, as a variant, the sub-module 32 has a tight-coupling architecture. This architecture is described in more detail in chapter 4.1.2 of the thesis Godha2006.

As a variant, the system 6 is equipped with additional sensors, such as for example a magnetometer, an odometer or a barometer. In this case, the correcting sub-module 32 is modified to take into account the measurements of these additional sensors to correct the orientation $O_e(k)$ constructed by the integrating sub-module 30.

In another embodiment, when the first set of conditions is met, i.e. when replacement of the angle $\psi_c(k)$ with the angle $\psi_m(k)$ is inhibited, the sub-module 32 executes another Kalman filter instead of the filter 34 to construct the orientation $O_c(k)$. This other Kalman filter, in contrast to the filter 34, receives the angle $\psi_m(k)$ directly and uses the angle $\psi_m(k)$ to update the state vector $X_{k|k}$ depending on the difference between the measured yaw angle and the yaw angle predicted by the block 38.

What has been described here also applies to the case where the position, orientation and speed of the vehicle are expressed in other frames of reference. In these cases, it is possible, via a simple change of frame of reference, to return to the situation described here. By way of example of other frames of reference that may be used instead of the frame of reference $R_T$, mention may be made of the ECI frame (ECI being the acronym of Earth Centered Inertial). The ECI frame is not stationary with respect to the Earth's surface since the Earth rotates in this frame of reference. The frame of reference $R_T$ may also be a frame of reference that is stationary with respect to the stars.

Section III: Advantages of the Described Embodiments

Not using the measured angle $\psi_m(k)$ to correct the orientation $O_e(k)$ allows instabilities that appear in the orientation determined by the system 6 to be limited. This therefore allows convergence of the orientation determined by the system 6 to an accurate orientation, i.e. an orientation for which the margin of error is smaller than 5 degrees or 1 degree, to be accelerated. In parallel, delivering to the output 7 an orientation $O_d(k)$ in which the angle $\psi_c(k)$ has been replaced by the angle $\psi_m(k)$ allows, during a transient phase that occurs on start-up of the system 6, an estimation of the orientation of the vehicle that is more accurate to be obtained.

Stopping the replacement of the angle $\psi_c(k)$ with the angle $\psi_m(k)$ as soon as the margin of error in the corrected angle $\psi_c(k)$ is low enough allows, after the time at which the first set of conditions is met, a determined orientation to be obtained for the vehicle 2 that is more accurate than would be the case if the angle $\psi_e(k)$ continued to be replaced with the angle $\psi_m(k)$. This therefore improves the determination of the orientation of the vehicle.

No longer using the angle $\psi_m(k)$ to determine the orientation of the vehicle once the first set of conditions is met simplifies the system 6 and accelerates the determination of the orientation of the vehicle. In addition, the orientation of the vehicle thus determined is considered to be more accurate.

Obtaining the angle $\psi_m(k)$ from a ratio between the speeds $v_{east}(k)$ and $v_{north}(k)$ measured by the unit 10 allows the angle $\psi_m(k)$ to be obtained without having to use an additional sensor, such as, for example, a magnetometer or a dual-antenna satellite geopositioning unit. A dual-antenna geopositioning unit is capable of measuring the orientation of the vehicle in addition to its position and its speed. This also allows the need to resort to methods for measuring the angle $\psi_m(k)$ based on measurement of the vector of the Earth's rotation to be avoided. The latter method is known as gyro-compassing. The gyro-compassing method requires a very sensitive gyrometer to be used. Thus, measurement of the angle $\psi_m(k)$ based on the speeds $v_{east}(k)$ and $v_{north}(k)$ simplifies the realization of system 6.

Detecting a backward movement allows this information to be taken into account to obtain a more accurate measured angle $\psi_m(k)$.

Detecting a backward movement from the measurements of the accelerometer 14 allows this movement to be detected independently of the accuracy of the position, orientation and speed determined for the vehicle 2. This therefore allows the backward movement to be detected more reliably just after start-up of the system 2, i.e. during the transient phase in which the margins of error in the determined position, orientation and speed may be large.

Similarly, detecting a backward movement from the measurements of a sensor independent of the accelerometer 14, of the gyrometer 16 and of the unit 10 also allows this backward movement to be reliably detected, notably during the transient phase.

The invention claimed is:

1. A method for determining a position and an orientation of a vehicle using a locating system attached to the vehicle, said locating system comprising a satellite geopositioning unit, an inertial navigation unit, processing circuitry to integrate inertial measurements, and correcting circuitry, said method comprising:
   measuring, with the satellite geopositioning unit, the position of the vehicle or the position and a speed of the vehicle,
   measuring, with the inertial navigation unit, an acceleration and an angular velocity of the vehicle,
   constructing, with the processing circuitry, an estimated position and an estimated orientation of the vehicle from a previous position and a previous orientation of the vehicle and using the measurements of the acceleration and the angular velocity taken since said previous position and said previous orientation of the vehicle,
   correcting, with the correcting circuitry and using the measurements of the satellite geopositioning unit, the estimated position and the estimated orientation to obtain a first corrected position and a first corrected orientation, the first corrected orientation including a corrected yaw angle of the vehicle, wherein the method further comprises:
   obtaining, with the locating system, a measured yaw angle of the vehicle that is independent of the angular velocity measurements taken by the inertial navigation unit,
   replacing, in the first corrected orientation, the corrected yaw angle with the measured yaw angle, to obtain a second corrected orientation, and
   delivering, to an output of the locating system, the first corrected position and the second corrected orientation by way of the estimated position and the estimated orientation determined for the vehicle, respectively, and using, on a next execution of the constructing step, the first corrected position and the second corrected orientation by way of the previous position and the previous orientation, respectively.

2. The method as claimed in claim 1, wherein the method further comprises:
   verifying that a set of one or more preset conditions is met, said set of conditions comprising at least one condition chosen from a group consisting of the following conditions:
   a margin of error in the measured yaw angle is larger than a preset threshold,
   a margin of error in the corrected yaw angle is smaller than a preset threshold, and
   a difference between the measured yaw angle and the corrected yaw angle is smaller than a preset threshold,
   as long as said set of conditions is not met, the replacing and delivering steps are executed, and
   as soon as said set of conditions is met, the replacing and delivering steps are inhibited.

3. The method as claimed in claim 2, wherein, from a moment when the replacing and delivering steps are inhibited and as long as the one or more preset set of conditions remains met, use of the measured yaw angle to determine the estimated orientation of the vehicle is inhibited.

4. The method as claimed in claim 2, wherein the replacing and delivering steps are executed in a transient phase with which the method begins.

5. The method as claimed in claim 1, wherein to obtain the measured yaw angle that is independent of the angular velocity measurements taken by the inertial navigation unit, the method further comprises:
   computing a first angle from a ratio between speeds of the vehicle measured in first and second orthogonal directions, respectively, the first and second directions being fixed and parallel to the surface of Earth, and
   generating the measured yaw angle from the computed first angle.

6. The method as claimed in claim 5, wherein to generate the measured yaw angle from the computed first angle, the method further comprises:
   detecting a backward movement of the vehicle with the locating system,
   when the backward movement of the vehicle is detected, setting the measured yaw angle equal to the first angle plus 180°, and when the backward movement of the vehicle is not detected, setting the measured yaw angle equal to the first angle.

7. The method as claimed in claim 6, wherein to detect a backward movement of the vehicle, the method further comprises:
obtaining an acceleration of the vehicle along the forward direction of movement of the vehicle, from the measurements of an accelerometer of the inertial navigation unit,
computing the speed of the vehicle along the forward direction of movement from the obtained acceleration,
comparing the computed speed to a preset threshold,
when the computed speed is higher than said threshold, not detecting backward movement, and
when the computed speed is lower than said threshold, detecting the backward movement.

8. The method as claimed in claim 5, further comprising obtaining the speeds of the vehicle measured in the first and second orthogonal directions, respectively, from measurements of the position or the speed of the vehicle taken by the satellite geopositioning unit.

9. The method as claimed in claim 6, wherein:
the method further comprises obtaining the speeds of the vehicle measured in the first and the second orthogonal directions, respectively, from the measurements of the position or of the speed of the vehicle taken by the satellite geopositioning unit, and
to detect a backward movement of the vehicle, the method further comprises:
comparing a first term to a second term, the first term being equal to $|\alpha-(\psi(k)-\pi)|$ and the second term being equal to $|\alpha-(\psi(k))|$, where $\alpha$ is the first angle computed at a time k and expressed in radians, $\psi(k)$ is equal to the corrected yaw angle at the time k expressed in radians or to the value, expressed in radians, of the yaw angle measured at the time k by an additional sensor independent of the satellite geopositioning unit,
when the first term is lower than the second term, detecting the backward movement, and
when the first term is higher than the second term, not detecting the backward movement.

10. The method as claimed in claim 1, wherein, the correcting step further comprises using a Kalman filter to correct the position and the orientation estimated by the processing circuitry.

11. A non-transitory computer-readable medium that is readable by a microprocessor, said medium storing instructions for performing the method as claimed in claim 1, when the stored instructions are executed by the microprocessor.

12. A locating system, configured to be attached to a vehicle, for determining a position and an orientation of said vehicle, said locating system comprising:
a satellite geopositioning unit configured to measure the position of the vehicle or the position and a speed of the vehicle,
an inertial navigation unit containing an accelerometer and a gyrometer to measure an acceleration and an angular velocity of the vehicle,
processing circuitry configured to integrate inertial measurements and to construct an estimated position and an estimated orientation of the vehicle from a previous position and a previous orientation of the vehicle and using the measurements of the acceleration and the angular velocity taken since said previous position and said previous orientation of the vehicle,
correcting circuitry configured to correct, using the measurements of the satellite geopositioning unit, the estimated position and the estimated orientation so as to obtain a first corrected position and a first corrected orientation, the first corrected orientation including a corrected yaw angle of the vehicle, and
substituting circuitry configured to
obtain a measured yaw angle of the vehicle that is independent of the angular velocity measurements taken by the gyrometer of the inertial navigation unit,
replace, in the first corrected orientation, the corrected yaw angle with the measured yaw angle, to obtain a second corrected orientation, and
deliver, to an output of the locating system, the first corrected position and the second corrected orientation by way of the estimated position and the estimated orientation determined for the vehicle, respectively,
wherein the processing circuitry is further configured to use, in a next construction of the estimated position and the estimated orientation of the vehicle, the first corrected position and the second corrected orientation by way of the previous position and the previous orientation, respectively.

* * * * *